United States Patent
Zhang

(10) Patent No.: US 10,800,015 B2
(45) Date of Patent: Oct. 13, 2020

(54) CONCAVE DRIVE SHAFT IN COMBINATION WITH A POWER TOOL

(71) Applicant: APACH INDUSTRIAL CO., LTD., Taichung (TW)

(72) Inventor: Yi-Wei Zhang, Taichung (TW)

(73) Assignee: Apach Industrial Co., Ltd., Taichung (TW)

( * ) Notice: Subject to any disclaimer, the term of this patent is extended or adjusted under 35 U.S.C. 154(b) by 0 days.

(21) Appl. No.: 16/258,002

(22) Filed: Jan. 25, 2019

(65) Prior Publication Data

US 2019/0270188 A1 Sep. 5, 2019

(30) Foreign Application Priority Data

Mar. 2, 2018 (TW) .............................. 107202772 A

(51) Int. Cl.
*B25B 23/00* (2006.01)
*B25B 21/00* (2006.01)
*B25F 5/00* (2006.01)

(52) U.S. Cl.
CPC ...... *B25B 23/0035* (2013.01); *B23B 2231/04* (2013.01); *B25B 21/00* (2013.01); *B25F 5/00* (2013.01); *Y10T 279/3406* (2015.01)

(58) Field of Classification Search
CPC ................................................ B25B 23/0035
See application file for complete search history.

(56) References Cited

U.S. PATENT DOCUMENTS

| | | | |
|---|---|---|---|
| 7,770,495 B1 * | 8/2010 | Huang | B25B 23/0035 81/177.5 |
| 8,146,461 B1 * | 4/2012 | Su | B25B 23/0035 403/322.1 |
| 8,943,931 B2 * | 2/2015 | Chiang | B25B 15/001 279/75 |
| 9,073,189 B2 * | 7/2015 | Chen | B25B 21/007 |
| 9,884,411 B2 * | 2/2018 | Hsu | B25B 23/0028 |
| 10,434,632 B2 * | 10/2019 | Chang | B25B 23/12 |
| 2015/0202751 A1 * | 7/2015 | Chen | B25B 23/0035 279/9.1 |
| 2016/0311091 A1 * | 10/2016 | Wang | B25B 23/0035 |
| 2019/0283221 A1 * | 9/2019 | Chen | B25B 23/0014 |
| 2020/0016729 A1 * | 1/2020 | Zimmermann | B25B 23/0035 |

FOREIGN PATENT DOCUMENTS

DE 29921668 U1 * 3/2000 ........... B25B 23/035

* cited by examiner

*Primary Examiner* — Eric A. Gates
(74) *Attorney, Agent, or Firm* — Wang Law Firm, Inc.

(57) ABSTRACT

A concave drive shaft in combination with a power tool includes: the power tool, a drive shaft and a sleeve. The drive shaft is disposed in a power tool, and has a recess. The sleeve has a coupling post provided for inserting into the recess, so that the sleeve is assembled to the drive shaft. The position where the sleeve is connected to the drive shaft is located in the power tool, so that the portion of the sleeve located outside the power tool is shortened, which allows the power tool to be used in a narrow working environment after the sleeve is assembled to the power tool.

7 Claims, 16 Drawing Sheets

CONCAVE DRIVE SHAFT IN COMBINATION WITH A POWER TOOL

BACKGROUND

Field of the Invention

The present invention relates to a power tool, and more particularly to a concave drive shaft in combination with a power tool.

Related Prior Art

Please refer to FIG. 1, which is an exploded view of a general power tool assembly 10 which essentially comprises a power tool 11 and a sleeve 12. The power tool 11 has a spindle 111 extending along a lateral direction X. The sleeve 12 has a connecting section 121 and a working section 122. The connecting section 121 is provided with a recess 123 for engaging with the spindle 111, and the working section 122 is provided for contacting the workpiece.

However, after the sleeve 12 is assembled to the power tool 11, the connecting section 121 and the working section 122 of the sleeve 12 are located outside the power tool 11, so that the total length of the combination of the power tool 11 and the sleeve 12 is too long, and in a narrow working environment, the power tool 11 may not be able to reach the working position after the sleeve 12 is assembled to the power tool 11, resulting in difficulty in work.

In order to enable the power tool 11 to work in a narrow working environment after the sleeve 12 is assembled to the power tool, the present invention provides a concaved drive shaft in combination with a power tool to solve the problem of the length of the power tool 11 being too long after the combination of the sleeve 12.

The present invention has arisen to mitigate and/or obviate the afore-described disadvantages.

SUMMARY

One objective of the present invention is to solve the problem that the length of the combination of the power tool and the sleeve is too long, so that the length of the power tool can be applied to a narrow working environment after the sleeve is assembled to the power tool.

To achieve the above objective, the present invention provides a concave drive shaft in combination with a power tool, the power tool has a chamber provided with an opening, the concave drive shaft comprises:

a drive shaft disposed in the chamber, and having a drive section and a connecting section which are connected to each other, wherein a direction extending from the drive section to the connecting section is defined as a transverse direction, the drive section is connected to a power source of the power tool, the connecting section has a recess which opens in the transverse direction; and a sleeve having a coupling post provided for inserting into the recess.

Preferably, the recess has an inner surface, the coupling post has an outer surface, the inner surface is provided with a plurality of inner teeth arranged in sequence, and the outer surface is provided with a plurality of outer teeth arranged in sequence, when the coupling post is inserted into the recess, the inner teeth and the outer teeth are engaged with each other.

Preferably, the recess is a square hole, the coupling post is a square column, the coupling post has an outer surface which is provided with at least one positioning hole, at least one spring and at least one positioning ball, the at least one springs is disposed in the at least one positioning hole such that one end of the at least one spring abuts against a bottom surface of the at least one positioning hole, the at least one positioning ball is disposed at another end of the at least one spring, the recess has an inner surface which is provided with a plurality of ball cavities, when the coupling post is inserted into the recess, the at least one spring pushes the at least one positioning ball into the at least one ball cavity.

Preferably, the recess has an inner surface, the coupling post is provided with an annular groove, a pressing ring disposed in the annular groove, the pressing ring is made of an elastic material, so that the pressing ring is pushed against the inner surface of the recess after being inserted into the recess.

Preferably, the recess has an inner surface, the coupling post is a hexagonal column with a plurality of bending angles, each of the bending angles is provided with an engaging groove, the engaging grooves are aligned to each other such that the engaging grooves are arranged in annular shape, the inner surface is provided with an annular groove, and a C-ring is disposed in the annular groove, when the coupling post is inserted into the recess, the C-ring is pressed against the engaging grooves.

Preferably, the sleeve includes a working section detachable from the coupling post, a coupling head is protruded from one end of the coupling post and provided with a fixing groove with an annular shape, a C ring is disposed in the fixing groove, the working section is provided with a connecting hole, and an inner surface facing the connecting hole, when the coupling post is engaged in the connecting hole of the working section, the C ring is compressed by the inner surface, and thus the coupling post is fixed to the working section.

Preferably, a positioning hole is formed in an outer surface of the coupling post for accommodating a locking assembly which includes a spring and a first locking post, the first locking post has a first locking section and a second locking section, the first locking section has a larger diameter than the second locking section, so that the first locking post has a stepped shape in cross section, the first locking section has a positioning groove extending along an axial direction of the first locking post, the spring has one end abutted against a bottom surface of the positioning hole, and another end extended into the positioning groove and abutted against a bottom surface of the positioning groove, the drive shaft has a snap hole aligned with the positioning hole, and a diameter of the snap hole is equivalent to that of the second locking section.

Preferably, the working section and the coupling post of the sleeve are detachable from each other, the locking assembly includes an elastic member and a second locking post, the elastic member is bent to form a bottom portion and a locking portion, one side of the locking portion is open, the coupling post is further provided with a receiving hole communicating with the positioning hole, the elastic member is disposed in the receiving hole in such a manner that the bottom portion abuts against a bottom of the receiving hole, the locking portion is located at a position aligned to the positioning hole, the second locking post is provided with a clamping groove having an annular shape, and the locking portion is snap-fitted in the clamping groove, so that the second locking post is restrained by the locking portion without coming out of the positioning hole.

By such arrangements, the coupling post is locked in the recess and extends into the chamber, and the working section of the sleeve is located outside the chamber, so that the sleeve is firmly coupled to the drive shaft. By such arrangement, only the working section of the sleeve is located outside the power tool, which shortens the overall length of the power tool after the sleeve is assembled to the power tool, thereby enabling the power tool to extend into a narrow working environment.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

DETAILED DESCRIPTION

Figure 1:
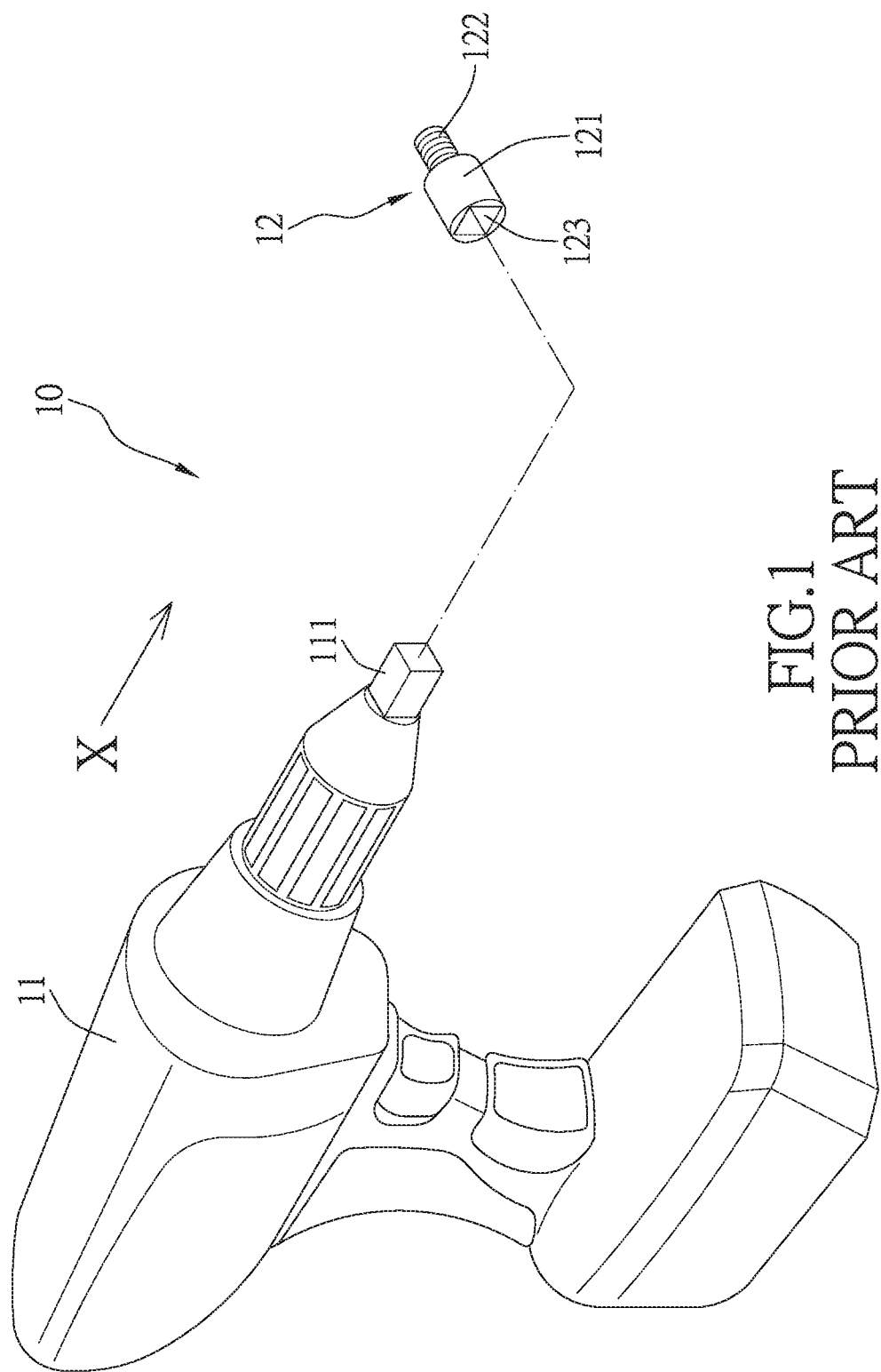
FIG. 1 is an exploded view of the conventional power tool and sleeve.

The present invention will be clearer from the following description when viewed together with the accompanying drawings, which show, for purpose of illustrations only, the preferred embodiment in accordance with the present invention.

Referring to FIGS. 2-9, a concave drive shaft in combination with a power tool 20 in accordance with a first preferred embodiment of the present invention is shown, the power tool 20 is provided with a chamber 21 which has an opening 22 in communication with the chamber 21, and the concave drive shaft in combination with the power tool, comprises: a drive shaft 30 and a sleeve 40.

The drive shaft 30 is disposed in the chamber 21, and has a drive section 31 and a connecting section 32 which are connected to each other. A direction extending from the drive section 31 to the connecting section 32 is defined as a transverse direction X. The drive section 31 is connected to a power source of the power tool 20. The connecting section 32 has a recess 321 which opens in the transverse direction X and has an inner surface 301.

The sleeve 40 has a working section 41 and a coupling post 42. The working section 41 is provided for connecting to a workpiece. The coupling post 42 extends from the one end surface of the working section 41 along the transverse direction X, has an outer surface 421, and is to be inserted into the recess 321.

Figure 2:
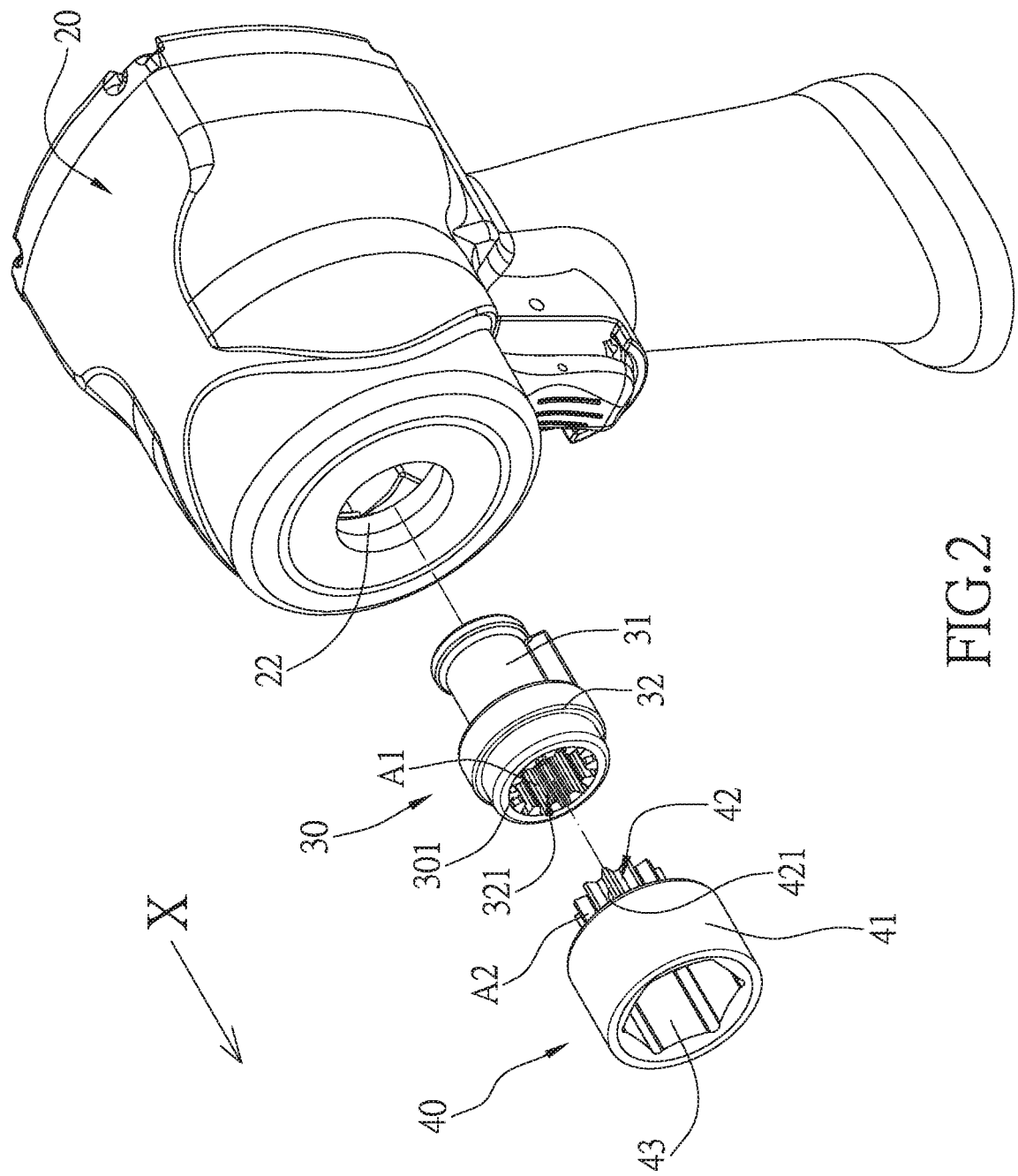
FIG. 2 is an exploded view of a first embodiment of the present invention.
Figure 3:
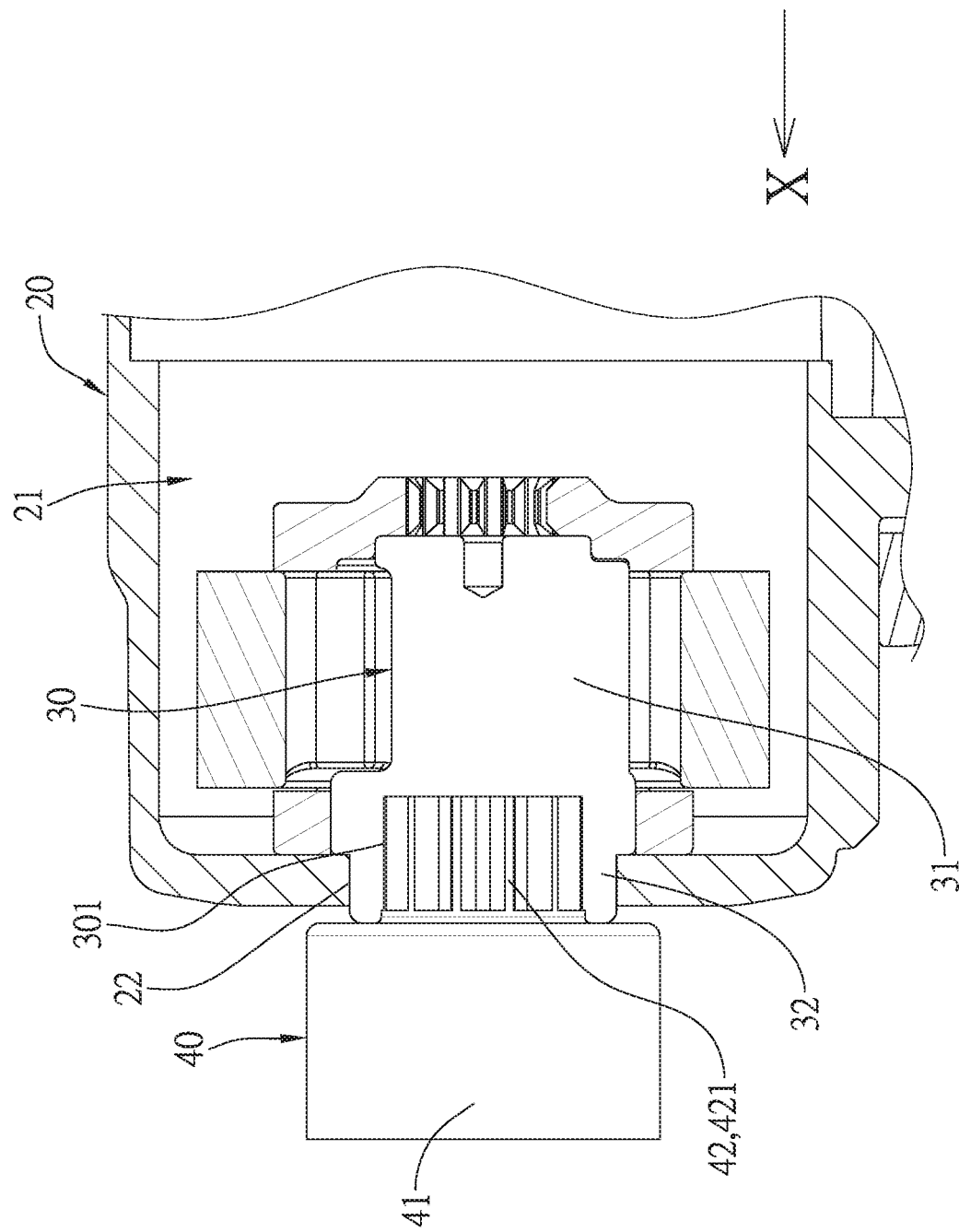
FIG. 3 is a cross-sectional view of the first embodiment of the present invention.

Referring to FIGS. 2 and 3, in this embodiment, the inner surface 301 is provided with a plurality of inner teeth A1 arranged in sequence, and the outer surface 421 is provided with a plurality of outer teeth A2 arranged in sequence. When the coupling post 42 is inserted into the recess 321, the inner teeth A1 and the outer teeth A2 are engaged with each other, so that the sleeve 40 can be firmly locked in the recess 321.

Figure 4:
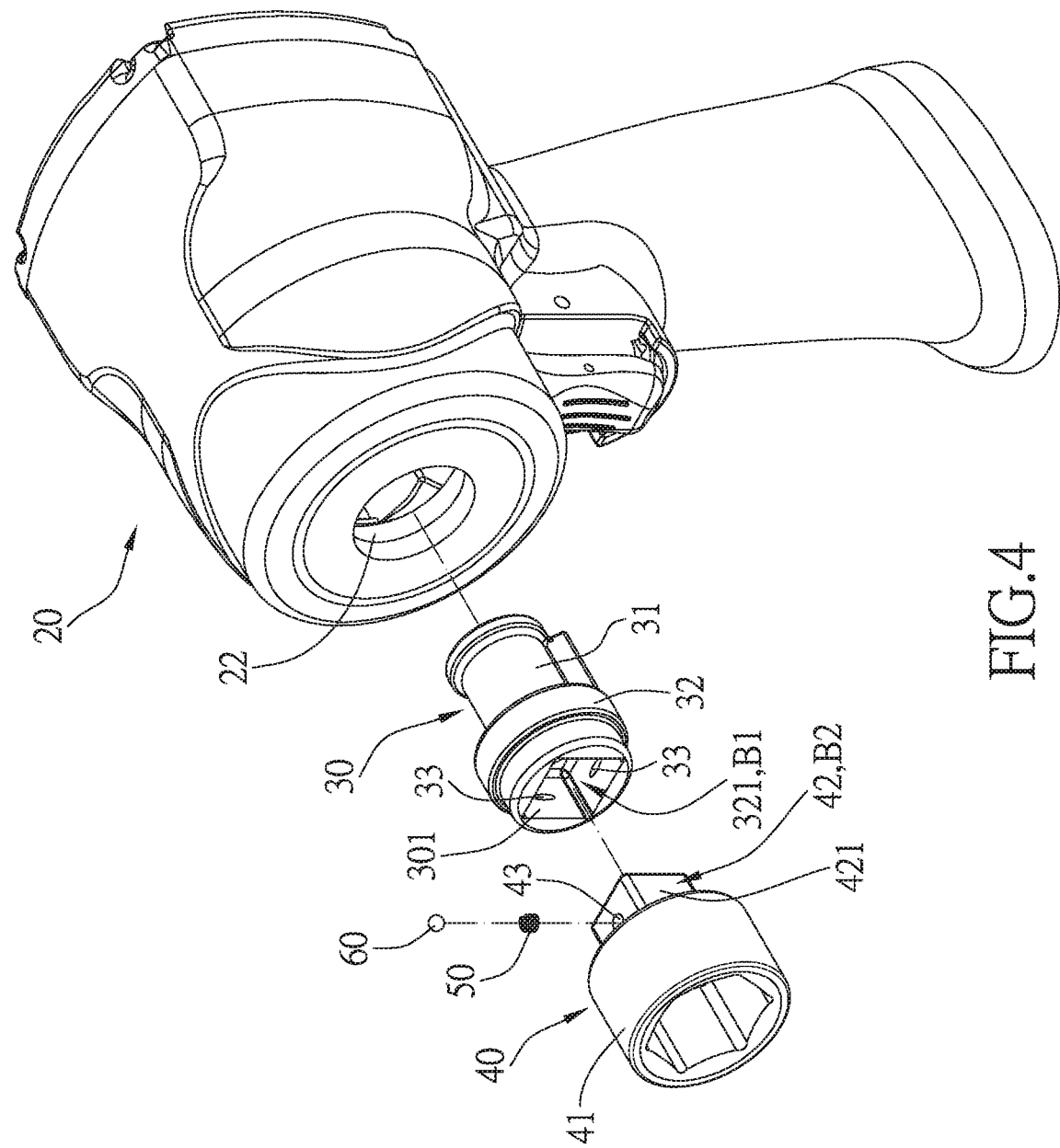
FIG. 4 is an exploded view of a second embodiment of the present invention.
Figure 5:
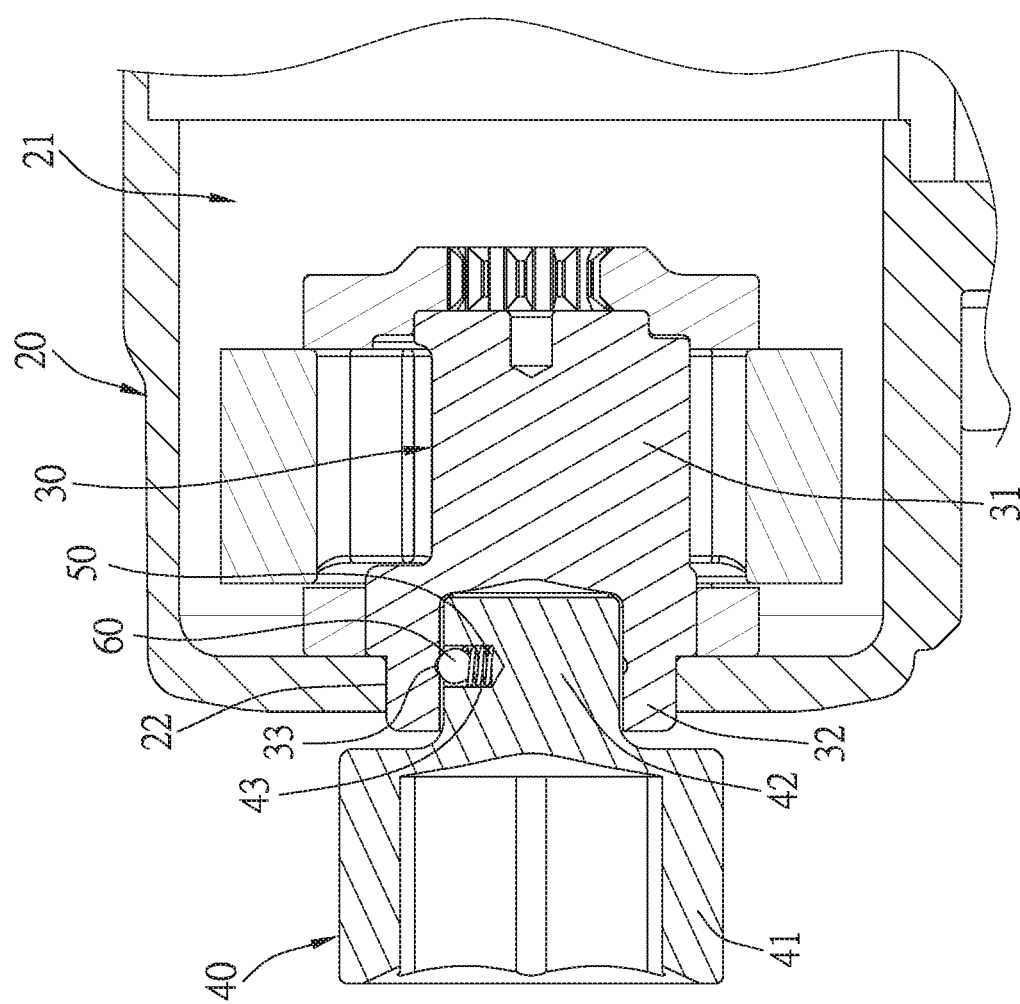
FIG. 5 is an assembly cross-sectional view of the second embodiment of the present invention.

Referring to FIGS. 4 and 5, in a second preferred embodiment, the shape of the recess 321 is a square hole, and the shape of the coupling post 42 is a square column. The outer surface 421 is concavely provided with at least one positioning hole 43, at least one spring 50 and at least one positioning ball 60. The at least one spring 50 is disposed in the at least one positioning hole 43 such that one end of the at least one spring 50 abuts against a bottom surface of the at least one positioning hole 43, and the at least one positioning ball 60 is disposed at the other end of the at least one spring 50. The inner surface 301 is provided with a plurality of ball cavities 33. When the coupling post 42 is inserted into the recess 321, the at least one spring 50 pushes the at least one positioning ball 60 into the at least one ball cavity 33, so that the sleeve 40 can be firmly engaged in the recess 321.

Figure 6:
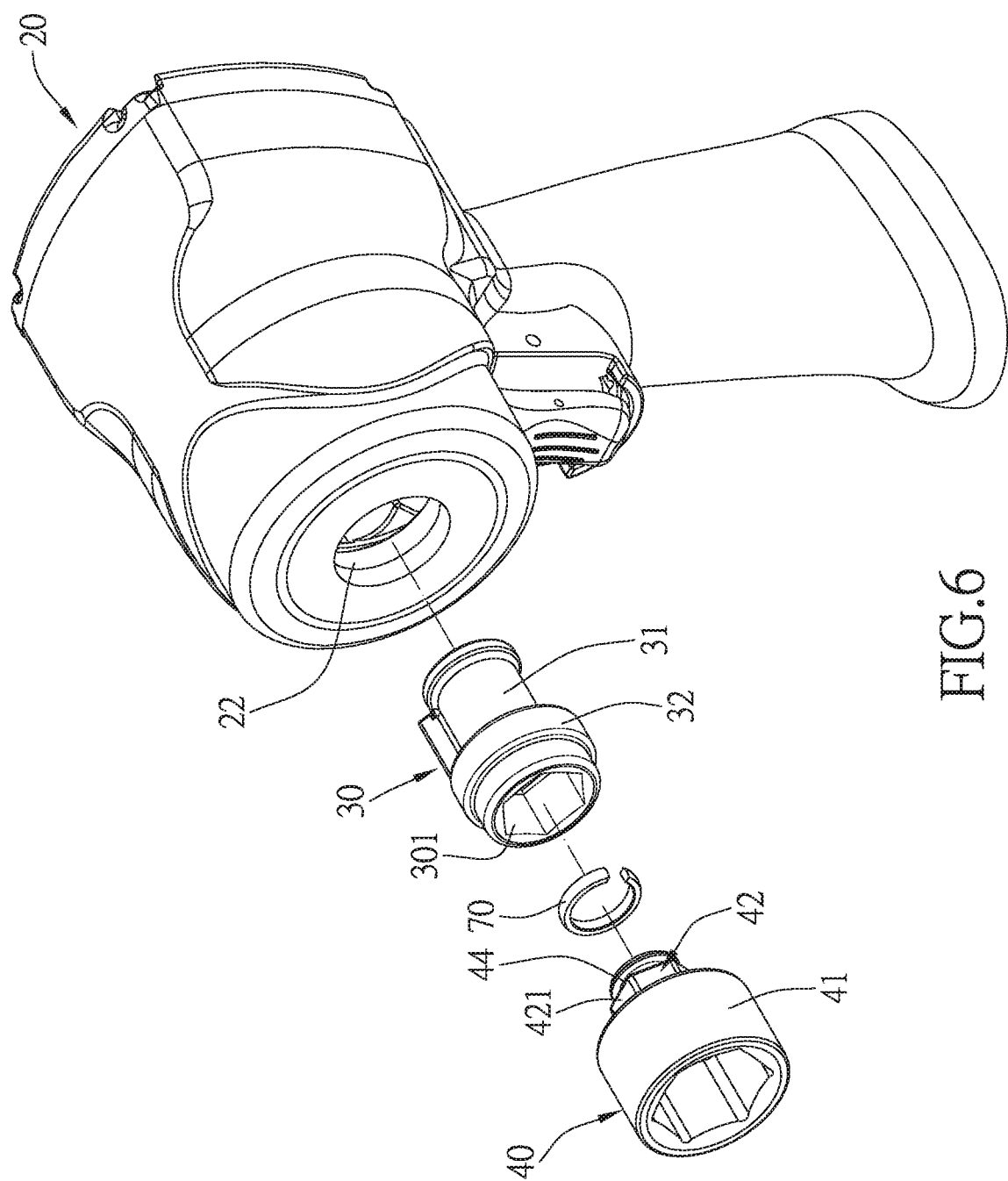
FIG. 6 is an exploded view of a third embodiment of the present invention.
Figure 7:
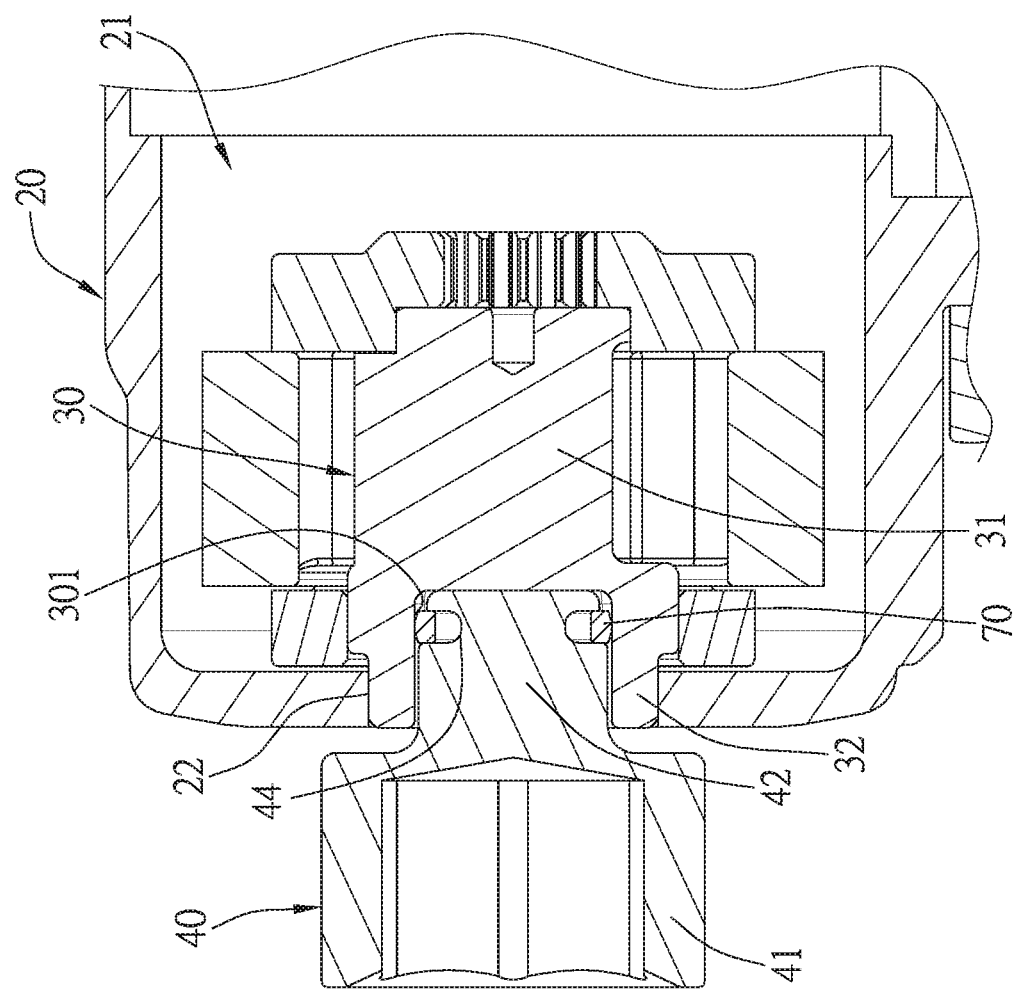
FIG. 7 is an assembly cross-sectional view of the third embodiment of the present invention.

Referring to FIGS. 6 and 7, in a third embodiment, the coupling post 42 is provided with an annular groove 44, and a pressing ring 70 disposed in the annular groove 44. The pressing ring 70 is made of an elastic material, so that the pressing ring 70 can be tightly attached to the inner surface 301 of the recess 321 after being inserted into the recess 321, so that the sleeve 40 can be tightly fitted in the recess 321.

Figure 8:
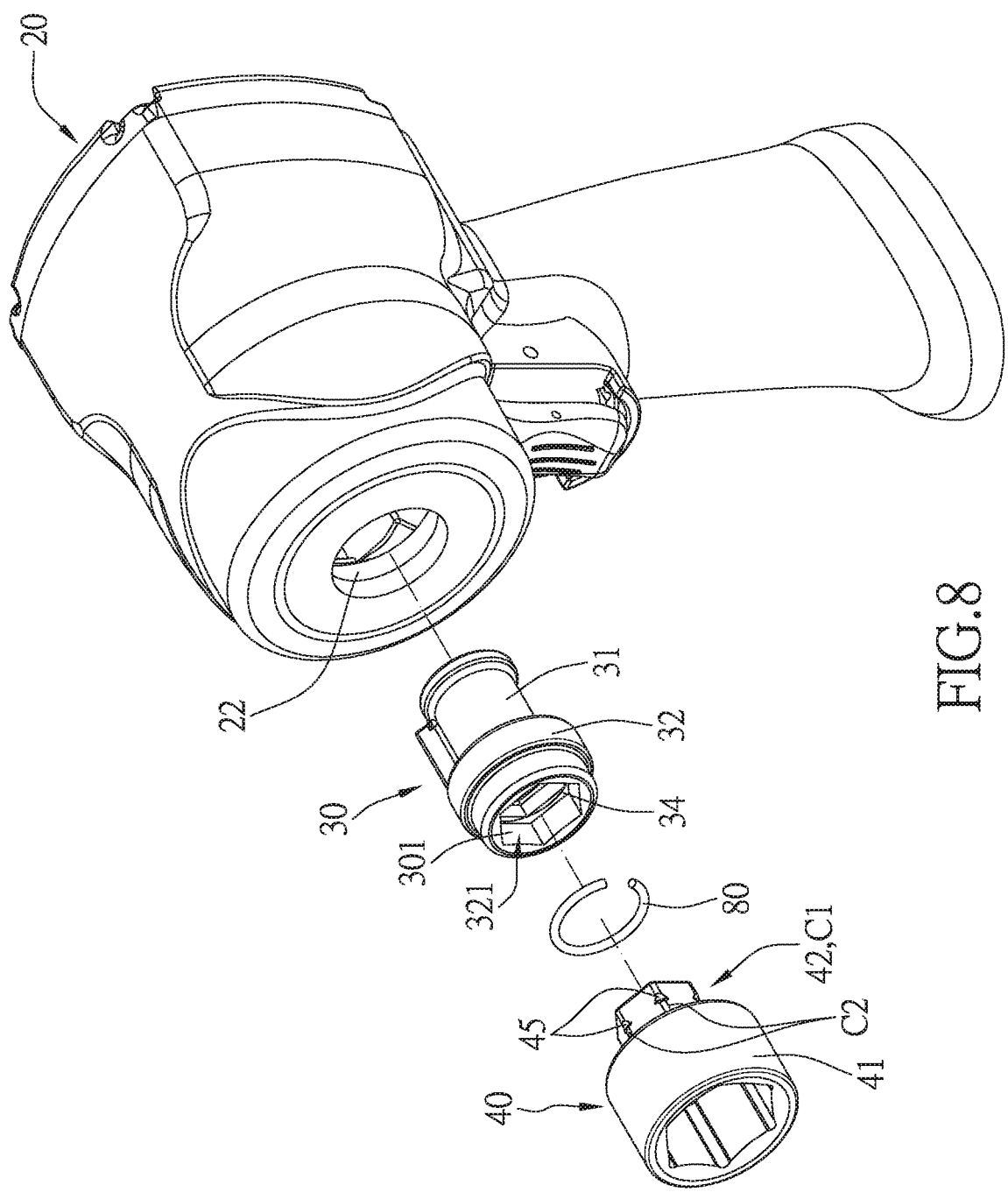
FIG. 8 is an exploded view of a fourth embodiment of the present invention.
Figure 9:
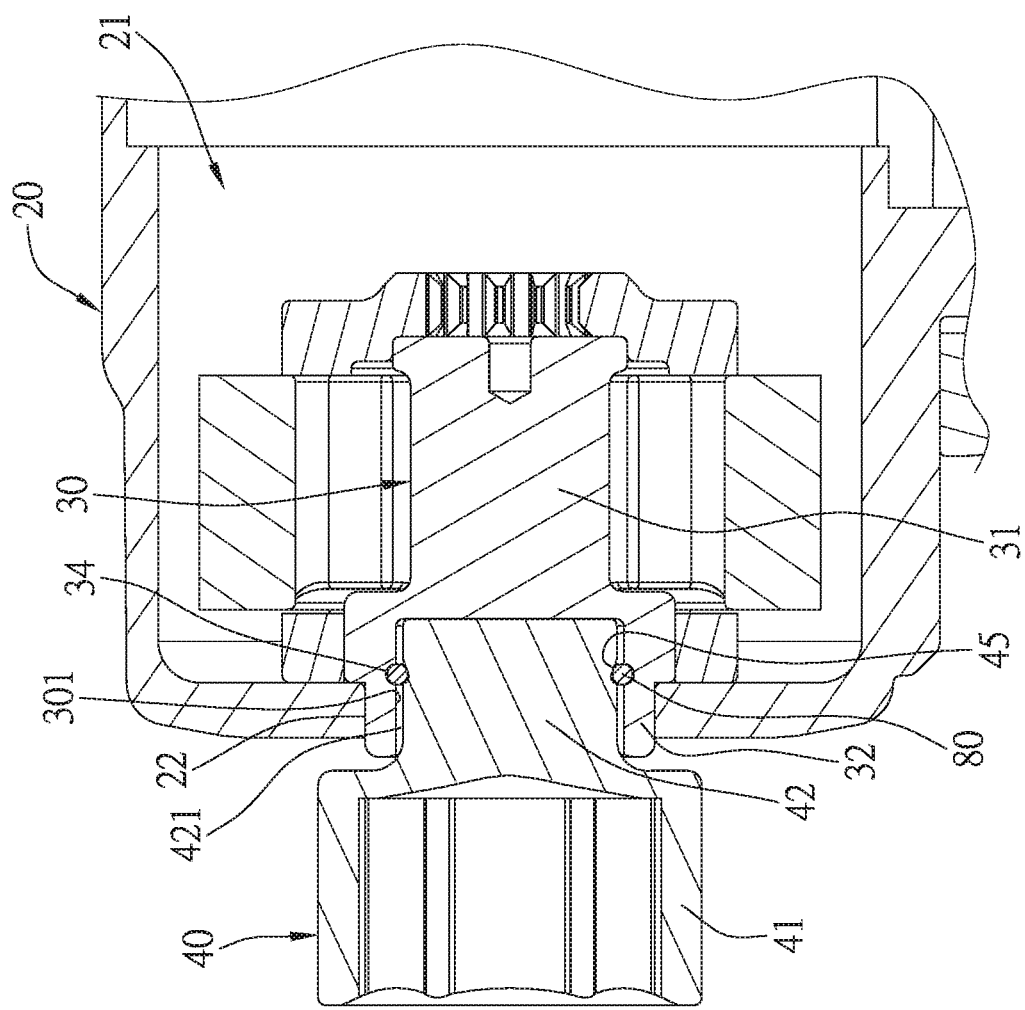
FIG. 9 is an assembly cross-sectional view of the fourth embodiment of the present invention.

Referring to FIGS. 8 and 9, in a fourth embodiment, the coupling post 42 is a hexagonal column with a plurality of bending angles C2, and each of the bending angles C2 is provided with an engaging groove 45. The engaging grooves 45 are aligned to each other such that the engaging grooves 45 are arranged in annular shape. The inner surface 301 is provided with an annular groove 34, and a C-ring 80 is disposed in the annular groove 34. When the coupling post 42 is inserted into the recess 321, the C-ring 80 can be pressed against the engaging grooves 45, so that the sleeve 40 can be tightly fitted in the recess 321.

Figure 10:
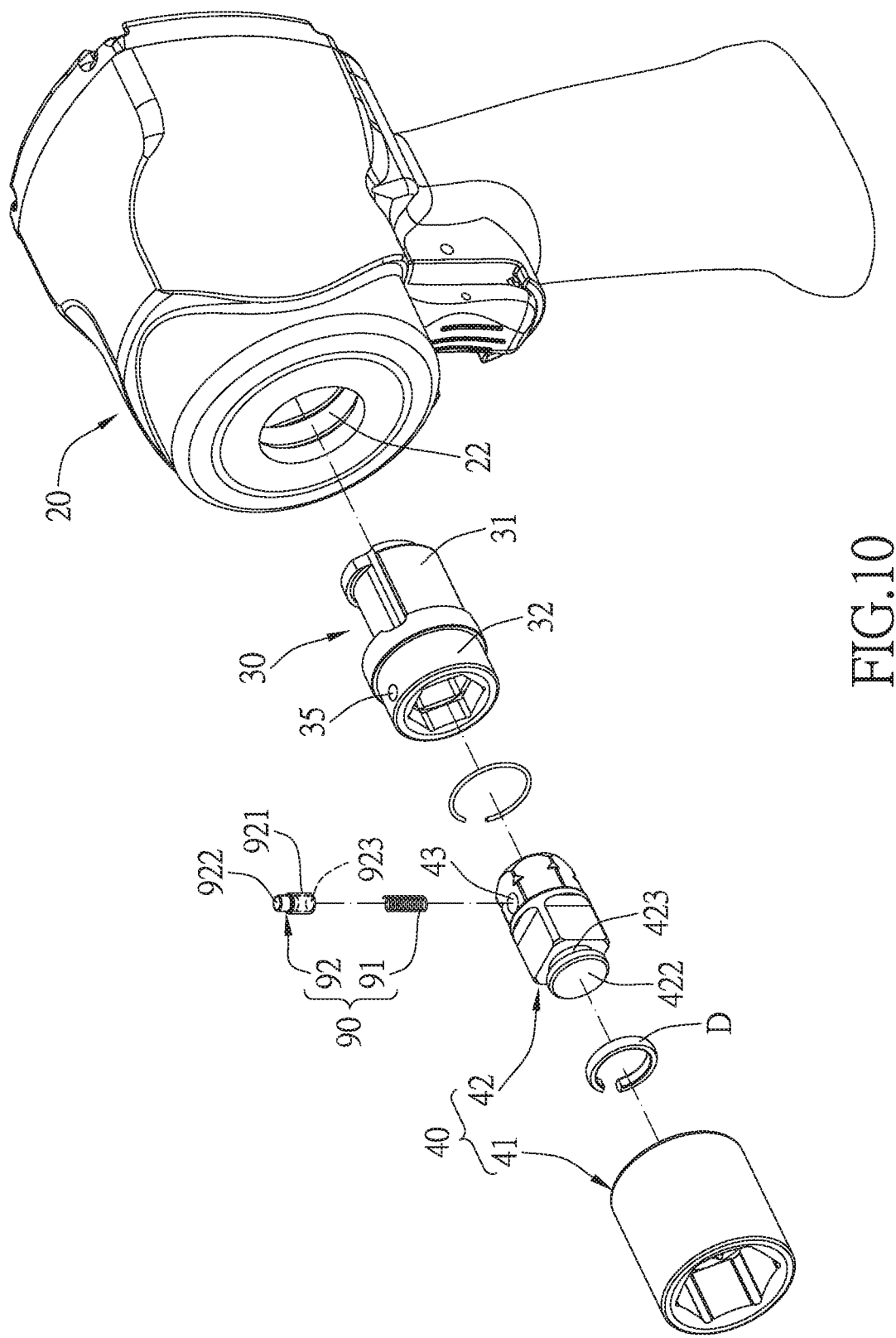
FIG. 10 is an exploded view of a fifth embodiment of the present invention.
Figure 11:
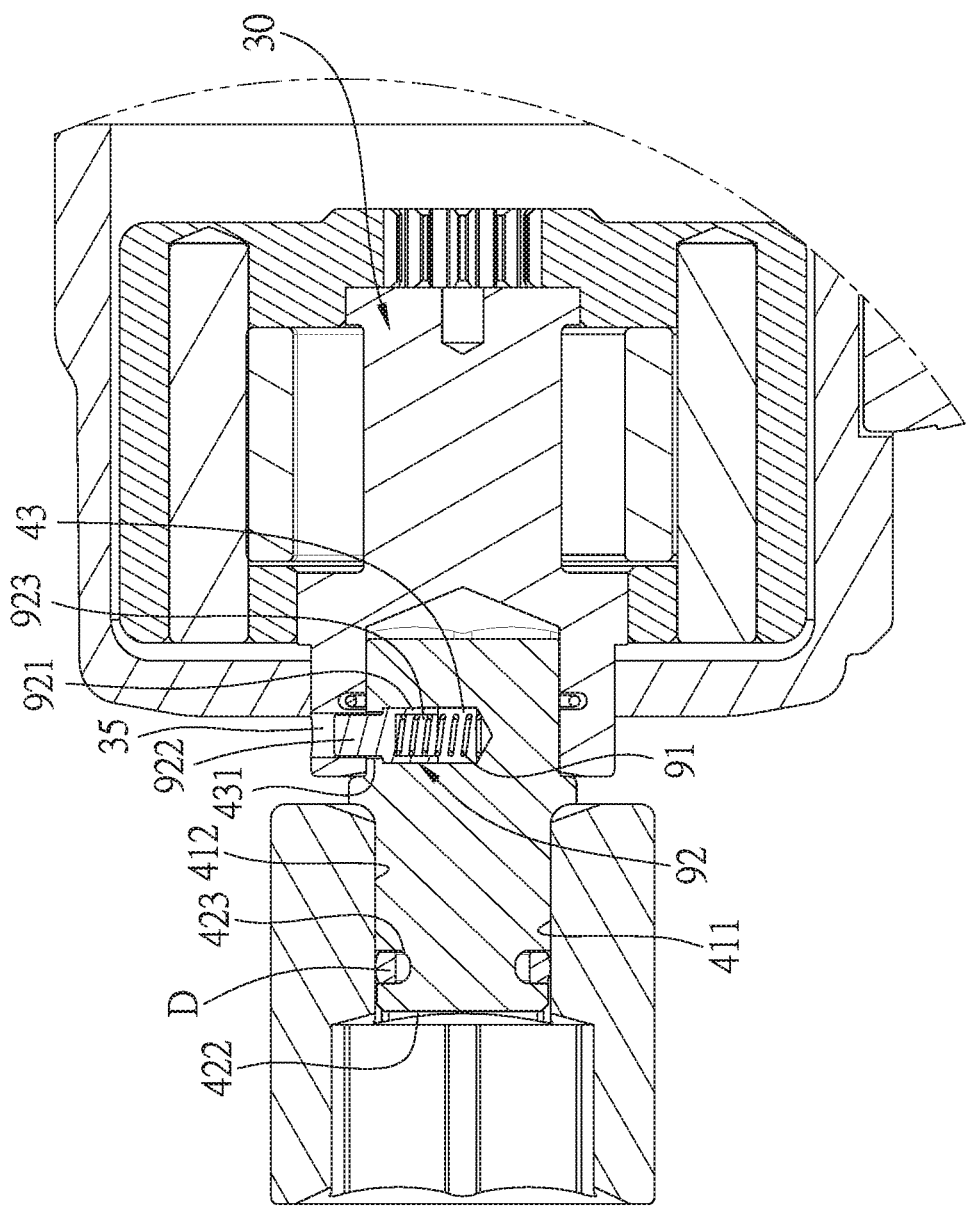
FIG. 11 is a cross-sectional view of the fifth embodiment of the present invention.

Referring to FIGS. 10 and 11, in a fifth embodiment, the working section 41 and the coupling post 42 of the sleeve 40 are detachable from each other. A coupling head 422 is protruded from one end of the coupling post 42 and provided with a fixing groove 423 with an annular shape, and a C ring D is disposed in the fixing groove 423. The working section 41 can be a general sleeve and is provided with a connecting hole 411, and an inner surface 412 facing the connecting hole 411. When the coupling post 42 is engaged with the connecting hole 411 of the working section 41, the C ring D is pressed against the inner surface 412, and thus the coupling post 42 is tightly fixed to the working section 41.

Preferably, in the fifth embodiment, the positioning hole 43 is formed in the outer surface 421 of the coupling post 42. In the positioning hole 43 is disposed a locking assembly 90 which includes a spring 91 and a first locking post 92. The first locking post 92 has a first locking section 921 and a second locking section 922. The first locking section 921 has a larger diameter than the second locking section 922, so that the first locking post 92 has a stepped shape in cross section. The first locking section 921 has a positioning groove 923 extending along the axial direction of the first locking post 92. The spring 91 has one end abutted against a bottom surface of the positioning hole 43, and another end extended into the positioning groove 923 and abutted against a bottom surface of the positioning groove 923. The drive shaft 30 has a snap hole 35 aligned with the positioning hole 43. A diameter of the snap hole 35 is equivalent to that of the second locking section 922, and smaller than that of the first locking section 921, so that the second locking section 922 is engaged in the snap hole 35.

Figure 12:
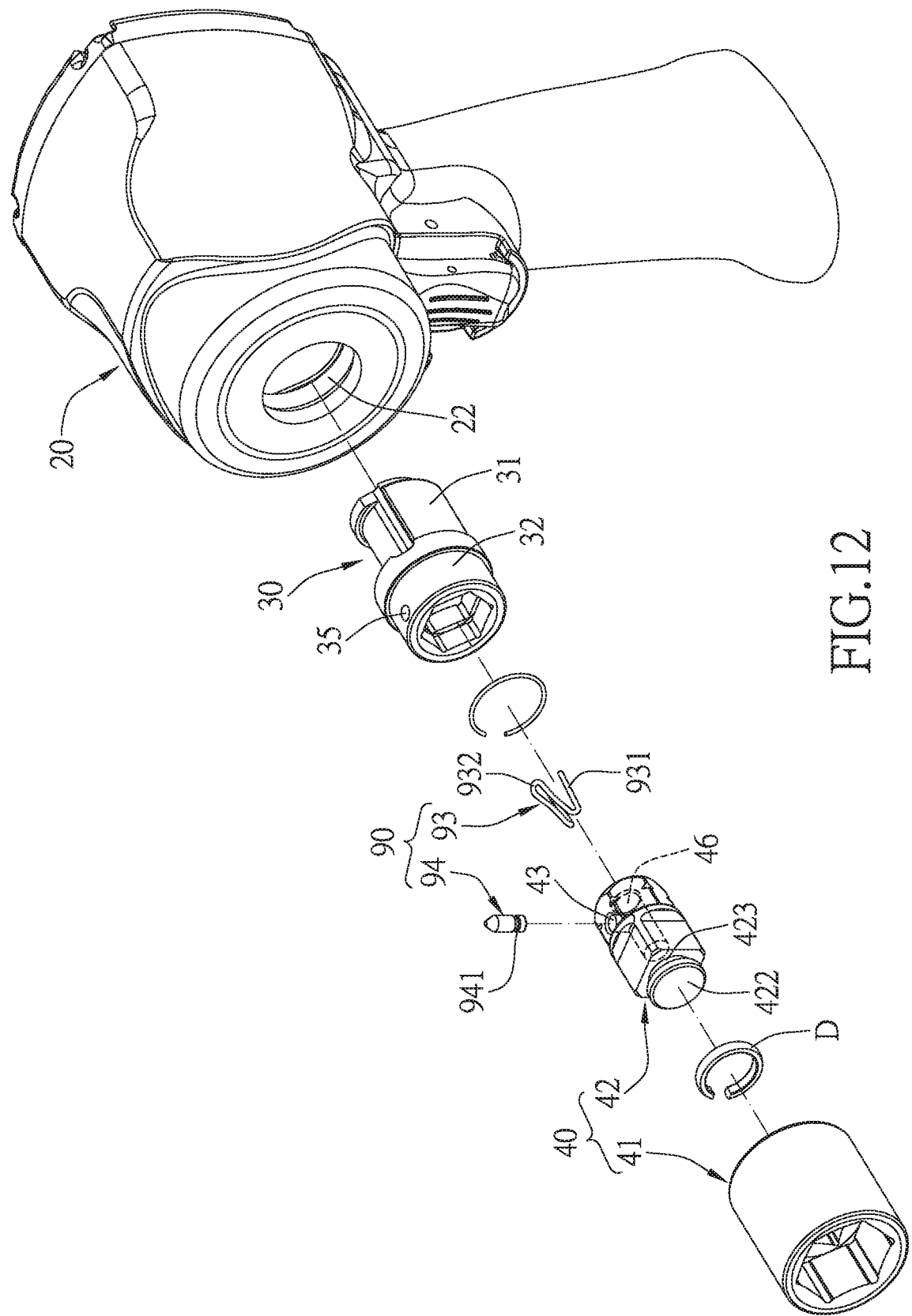
FIG. 12 is an exploded view of a sixth embodiment of the present invention.
Figure 13:
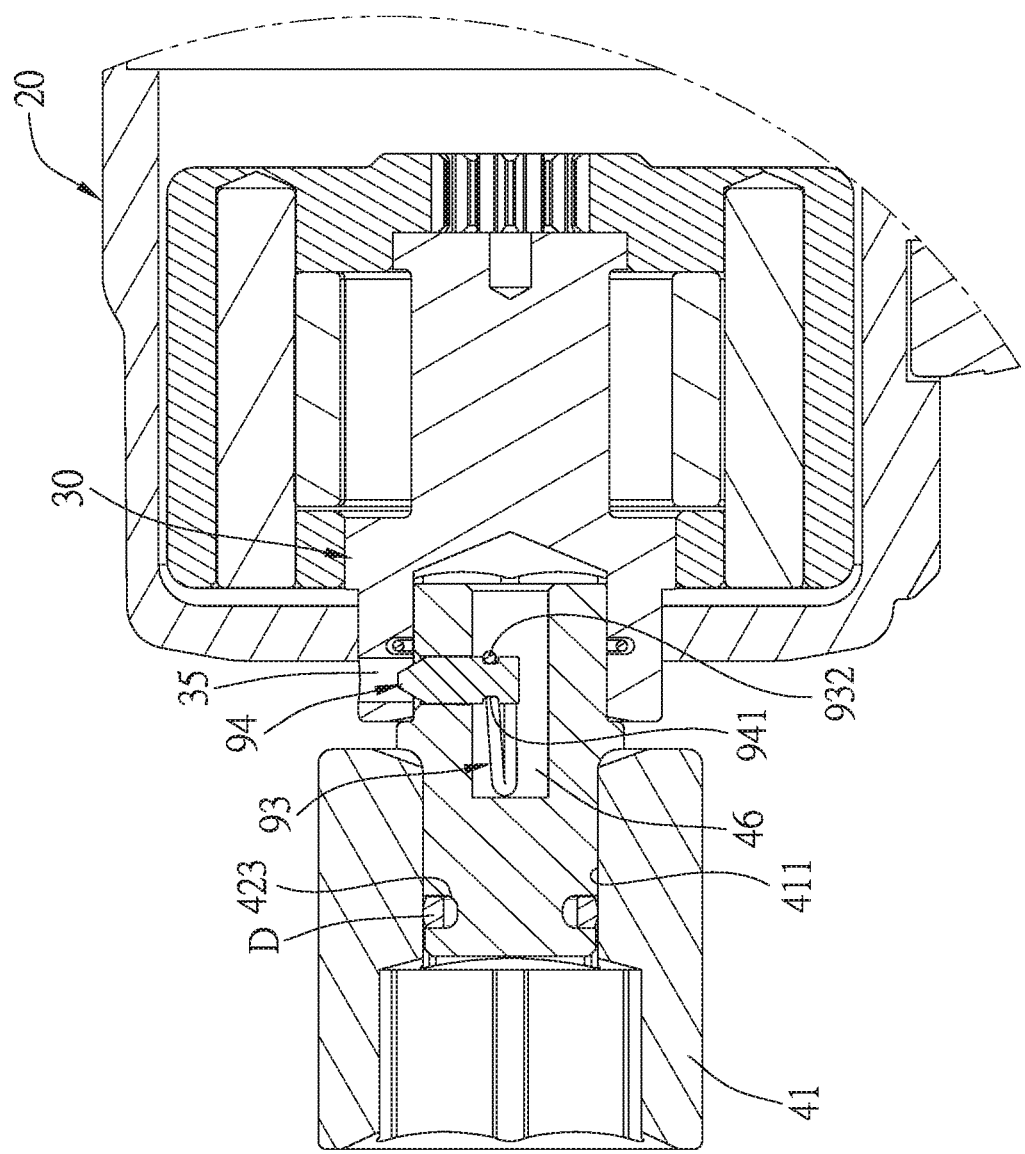
FIG. 13 is an assembly cross-sectional view of the sixth embodiment of the present invention.

Referring to FIGS. 12 and 13, in a sixth embodiment, the working section 41 of the sleeve 40 and the coupling post 42 are detachable from each other, and the locking assembly 90 has an elastic member 93 and a second locking post 94. The elastic member 93 is bent to form a bottom portion 931 and a locking portion 932, and one side of the locking portion 932 is open. The coupling post 42 is further provided with a receiving hole 46 communicating with the positioning hole 43. The elastic member 93 is disposed in the receiving hole 46 in such a manner that the bottom portion 931 abuts against a bottom of the receiving hole 46, and the locking portion 932 is located at a position aligned to the positioning hole 43. The second locking post 94 is provided with a clamping groove 941 having an annular shape, and the locking portion 932 is snap-fitted in the clamping groove 941, so that the second locking post 94 is restrained by the locking portion 932 without coming out of the positioning hole 43.

Figure 14:
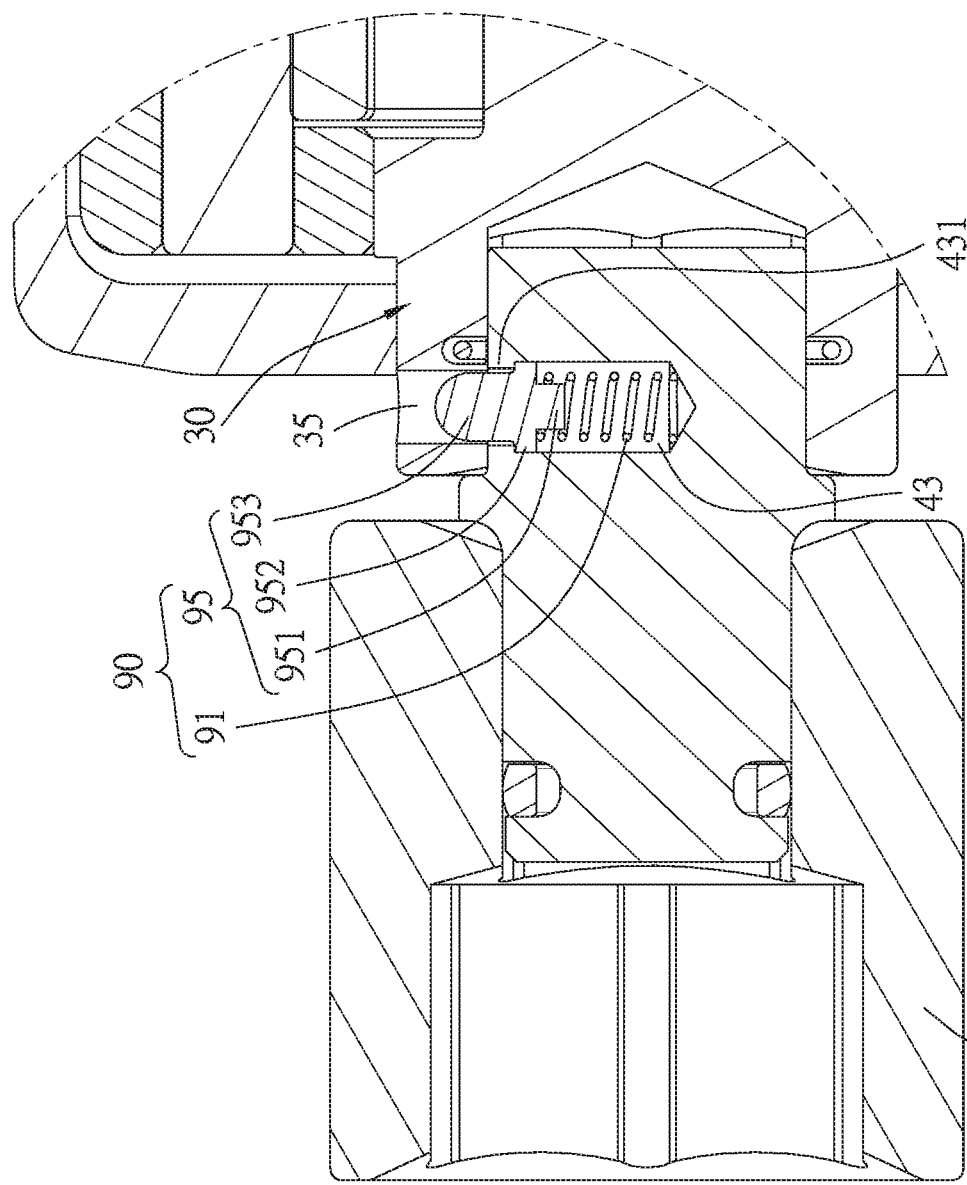
FIG. 14 is an assembly cross-sectional view of a seventh embodiment of the present invention.

Referring to FIG. 14, in a seventh embodiment, the locking assembly 90 has the spring 91 and a third locking post 95. The third locking post 95 has a connecting portion 951, a locking portion 952 and a protruding portion 953. A diameter of the connecting portion 951 is smaller than that of the spring 91, so that the connecting portion 951 can be inserted and fixed in the spring 91. In particular, a rim of the positioning hole 43 is provided with a stop portion 431 in the form of an annular protrusion. An outer diameter of the locking portion 952 is larger than an inner diameter of an opening defined by the stop portion 431, so that the locking portion 952 is stopped against the stop portion 431. The protruding portion 953 is in the shape of a protruding round head and can be snapped into the snap hole 35 such that the sleeve 40 is fixedly coupled to the drive shaft 30 by the locking assembly 90.

Figure 15:
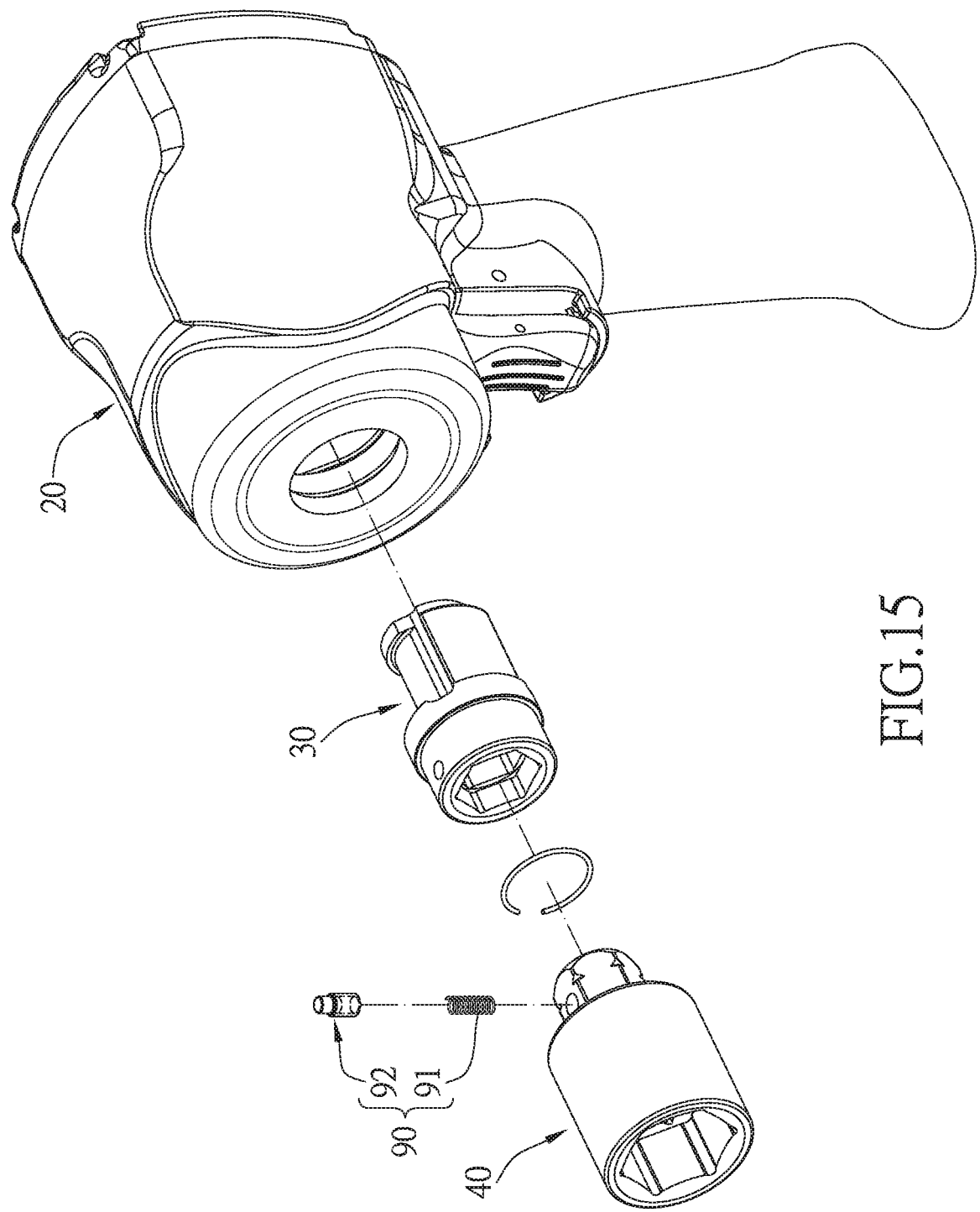
FIG. 15 is an exploded view of an eighth embodiment of the present invention.

Referring to FIG. 15, in an eighth embodiment, the sleeve 40 is integrally formed, and the locking assembly 90 consists of the spring 91 and the first locking post 92 of the fifth embodiment.

Figure 16:
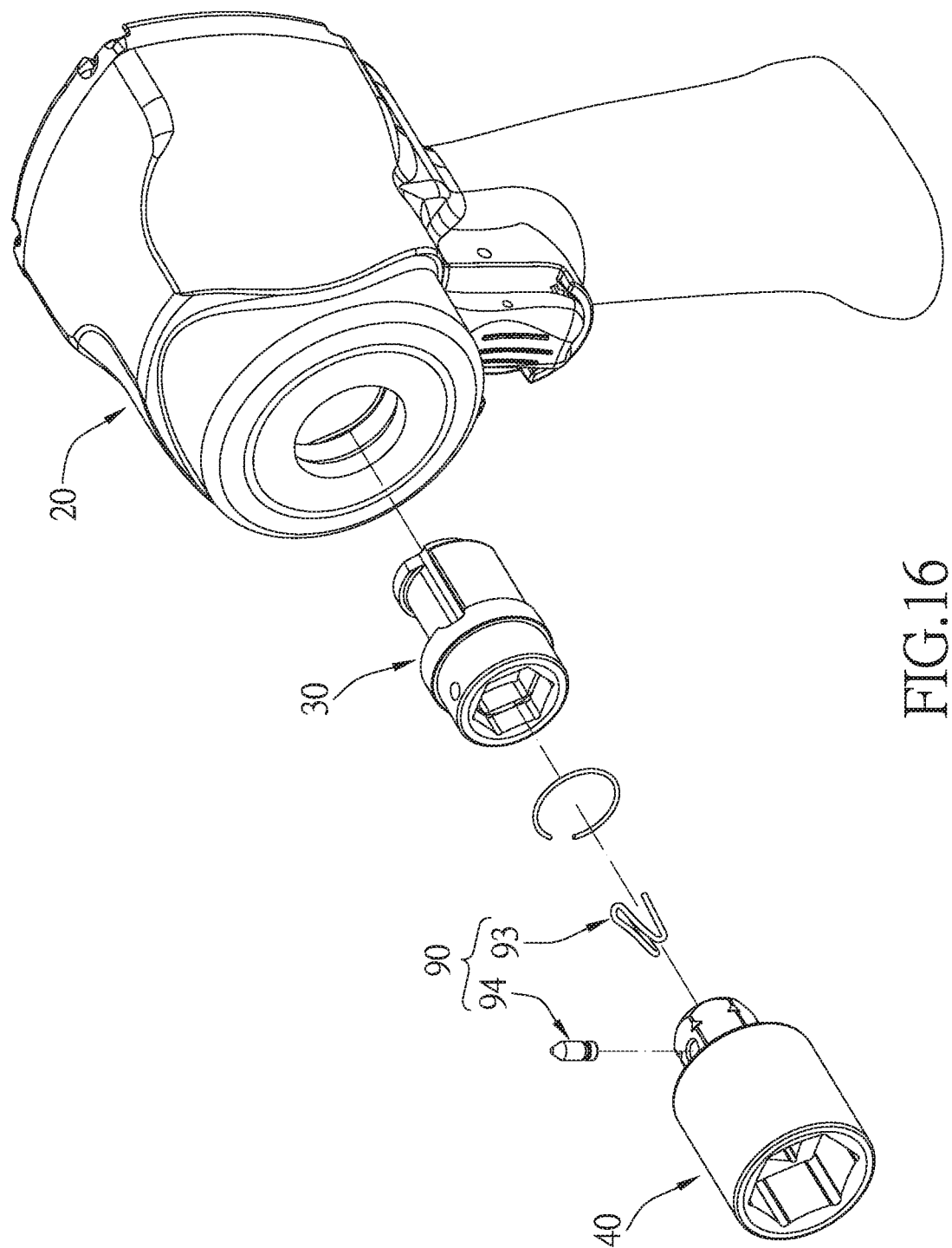
FIG. 16 is an exploded view of a ninth embodiment of the present invention.

Referring to FIG. 16, in a ninth embodiment, the sleeve 40 is integrally formed, and the locking assembly 90 consists of the elastic member 93 and the second locking post 94 of the sixth embodiment.

In the eighth and ninth embodiments, it can be known that regardless of whether the sleeve 40 is integrally formed or non-integrally formed, it does not affect the manner that the locking assembly 90 is composed, that is, any type of the locking assembly 90 can be used to secure the sleeve 40 and the drive shaft 30.

The above are the structure configuration and the connection relationship of the main components of the invention, and the use of the invention is as follows:

Referring to FIG. 2-9, when the user inserts the coupling post 42 of the sleeve 40 into the recess 321, the coupling post 42 is locked in the recess 321 and extends into the chamber 21, and the working section 41 of the sleeve 40 is located outside the chamber 21, so that the sleeve 40 is firmly coupled to the drive shaft 30. By such arrangement, only the working section 41 of the sleeve 40 is located outside the power tool 20, which shortens the overall length of the power tool 20 after the sleeve 40 is assembled to the power tool 20, thereby enabling the power tool 20 to extend into a narrow working environment.

While we have shown and described various embodiments in accordance with the present invention, it is clear to those skilled in the art that further embodiments may be made without departing from the scope of the present invention.

What is claimed is:

1. A concave drive shaft in combination with a power tool, comprising:
    the power tool having a chamber provided with an opening;
    a drive shaft disposed in the chamber, and having a drive section and a connecting section which are connected to each other, wherein a direction extending from the drive section to the connecting section is defined as a transverse direction, the drive section is provided for being connected to a power source of the power tool, the connecting section has a recess which opens in the transverse direction; and
    a sleeve having a coupling post inserted into the recess;
    wherein the sleeve includes a working section detachable from the coupling post, a coupling head is protruded from one end of the coupling post and provided with a fixing groove with an annular shape, a C ring is disposed in the fixing groove, the working section is provided with a connecting hole, and an inner surface facing the connecting hole, when the coupling post is engaged in the connecting hole of the working section, the C ring is compressed by the inner surface, and thus the coupling post is fixed to the working section, a positioning hole is formed in an outer surface of the coupling post for accommodating a locking assembly which includes a spring and a first locking post, the first locking post has a first locking section and a second locking section, the first locking section has a larger diameter than the second locking section, so that the first locking post has a stepped shape in cross section, the first locking section has a positioning groove extending along an axial direction of the first locking post, the spring has one end abutted against a bottom surface of the positioning hole, and another end extended into the positioning groove and abutted against a bottom surface of the positioning groove, the drive shaft has a snap hole aligned with the positioning hole, and a diameter of the snap hole is equivalent to that of the second locking section, and smaller than that of the first locking section.

2. The concave drive shaft in combination with the power tool as claimed in claim 1, wherein the recess has an inner surface, the coupling post has an outer surface, the inner surface is provided with a plurality of inner teeth arranged in sequence, and the outer surface is provided with a plurality of outer teeth arranged in sequence, when the coupling post is inserted into the recess, the inner teeth and the outer teeth are engaged with each other.

3. The concave drive shaft in combination with the power tool as claimed in claim 1, wherein the recess is a square hole, the coupling post is a square column, the coupling post has an outer surface which is provided with at least one positioning hole, at least one spring and at least one positioning ball, the at least one springs is disposed in the at least one positioning hole such that one end of the at least one spring abuts against a bottom surface of the at least one positioning hole, the at least one positioning ball is disposed at another end of the at least one spring, the recess has an inner surface which is provided with a plurality of ball cavities, when the coupling post is inserted into the recess, the at least one spring pushes the at least one positioning ball into the at least one ball cavity.

4. The concave drive shaft in combination with the power tool as claimed in claim 1, wherein the recess has an inner surface, the coupling post is provided with an annular groove, a pressing ring disposed in the annular groove, the pressing ring is made of an elastic material, so that the pressing ring is pushed against the inner surface of the recess after being inserted into the recess.

5. The concave drive shaft in combination with the power tool as claimed in claim 1, wherein the recess has an inner surface, the coupling post is a hexagonal column with a plurality of bending angles, each of the bending angles is provided with an engaging groove, the engaging grooves are aligned to each other such that the engaging grooves are arranged in annular shape, the inner surface is provided with an annular groove, and a C-ring is disposed in the annular groove, when the coupling post is inserted into the recess, the C-ring is pressed against the engaging grooves.

6. The concave drive shaft in combination with the power tool as claimed in claim 1, wherein a positioning hole is formed in an outer surface of the coupling post for accommodating a locking assembly which includes an elastic member and a second locking post, the elastic member is bent to form a bottom portion and a locking portion, one side of the locking portion is open, the coupling post is further provided with a receiving hole communicating with the positioning hole, the elastic member is disposed in the receiving hole in such a manner that the bottom portion abuts against a bottom of the receiving hole, the locking portion is located at a position aligned to the positioning hole, the second locking post is provided with a clamping groove having an annular shape, and the locking portion is snap-fitted in the clamping groove.

7. The concave drive shaft in combination with the power tool as claimed in claim 1, wherein a positioning hole is formed in an outer surface of the coupling post for accommodating a locking assembly which includes a spring and a third locking post, the third locking post has a connecting portion, a locking portion and a protruding portion, a diameter of the connecting portion is smaller than that of the spring, so that the connecting portion is capable of being inserted and fixed in the spring, a rim of the positioning hole is provided with a stop portion in the form of an annular protrusion, and an outer diameter of the locking portion is larger than an inner diameter of an opening defined by the stop portion.

* * * * *